United States Patent [19]

Shimada et al.

[11] 4,448,034

[45] May 15, 1984

[54] AIR-CONDITIONING SYSTEM FOR AN AUTOMOTIVE VEHICLE

[75] Inventors: Yukio Shimada, Yokohama; Tetsuya Iijima, Yamato; Mikio Tanino, Yokohama, all of Japan

[73] Assignee: Nissan Motor Company, Limited, Kanagawa, Japan

[21] Appl. No.: 359,351

[22] Filed: Mar. 18, 1982

[30] Foreign Application Priority Data

Mar. 19, 1981 [JP]   Japan ................................ 56-38645

[51] Int. Cl.³ .................... F25D 29/00; B60H 3/04; B60H 1/00
[52] U.S. Cl. .................................. 62/161; 62/244; 236/44 R; 98/2.09; 165/17; 165/25; 165/43
[58] Field of Search ............... 62/244, 161, 163, 164, 62/239, 243; 236/44 R, 44 A, 44 C; 98/2.08, 2.09; 165/17, 24, 25, 30, 33, 41, 42, 43

[56] References Cited

U.S. PATENT DOCUMENTS 4,354,547  10/1982  Sugiura .................................. 62/164

FOREIGN PATENT DOCUMENTS 18142  2/1978  Japan ................................. 98/2.09

*Primary Examiner*—Henry C. Yuen
*Assistant Examiner*—Harry Tanner
*Attorney, Agent, or Firm*—Lowe, King, Price & Becker

[57] ABSTRACT

A variable thermostat-type air conditioning system for an automotive vehicle passenger compartment has a dehumidification switch. When a driver depresses the dehumidification switch the compressor begins to operate as if the temperature-adjusting lever were set to the extreme COOL end. Therefore, it is possible to dehumidify or cool the passenger compartment without adjusting the temperature-adjusting lever which is already set to an appropriate lever position. The air-conditioning system according to the present invention comprises a temperature-sensitive element, a variable resistor linked to the temperature-adjusting lever, the dehumidification switch to short the variable resistor, and a thermocontrol amplifier, in addition to a standard compressor, evaporator, etc.

7 Claims, 15 Drawing Figures

PRIOR ART

AIR-CONDITIONING SYSTEM FOR AN AUTOMOTIVE VEHICLE

BACKGROUND OF THE INVENTION

1. Field of the Invention

The present invention relates generally to a variable thermostat-type air conditioning system, and more specifically to a dehumidification switch provided for the thermostat-type air conditioning system for an automotive vehicle.

2. Description of the Prior Art

As is well known, there exists a variable thermostat-type air conditioning system for an automotive vehicle having a refrigerant cooling cycle that is automatically stopped when the air conditioner output duct air temperature as detected by a temperature-sensitive element, reaches a preset passenger compartment air temperature determined by the position of a temperature adjusting lever; that is, the cooling cycle is intermittently operated or stopped so that the output duct air temperature lies within a preset temperature range.

In such an air-conditioning system, however, when the passenger compartment is warmed by heating low-temperature high-humidity outside air the warmed air supplied to the passenger compartment tends to cause the windshield glass to become obscured by condensation, particularly during the rainy season. To prevent or correct this condition, it is necessary to operate the air conditioning system as a dehumidifier. However, since the temperature adjusting lever (the passenger compartment air temperature presetting device) has already been set to an appropriate HOT position, the cooling compressor is not operated or turns off before the correct temperature is reached. Therefore, it is necessary for the vehicle operator to reset the temperature-adjusting lever, which has been previously set at an appropriate HOT position the lever is reset to the extreme COOL side on the air conditioning system panel. Then the operator resets the lever to the HOT position after dehumidification of the air and removal of the condensate.

The arrangement of the prior-art variable thermostat-type air conditioning system for an automotive vehicle is described in more detail hereinafter with reference to the attached drawings under DETAILED DESCRIPTION OF THE PREFERRED EMBODIMENTS.

SUMMARY OF THE INVENTION

With these problems in mind, therefore, it is the primary object of the present invention to provide a variable thermostat-type air conditioning system for an automotive vehicle wherein the driver can easily provide for dehumidification of incoming humid air when necessary, without having to adjust the temperature-adjusting lever which has already been set to an appropriate high-temperature position in order to warm passenger compartment air.

To achieve the above-mentioned object, the air-conditioning system according to the present invention comprises a dehumidification switch for short circuiting a variable resistor electrically connected in series with a temperature-sensitive element and mechanically linked with a temperature-adjusting lever the temperature-sensitive element is connected to a prior art thermocontrol amplifier, compressor evaporator, etc.

BRIEF DESCRIPTION OF THE DRAWINGS

The features and advantages of the variable thermostat type air-conditioning system according to the present invention will be more clearly appreciated from the following description, taken in conjunction with the accompanying drawings in which like reference numerals designate corresponding elements and in which;

FIGS. 3(A)–3(D) are graphical representations which assist in describing the operations of the prior-art variable thermostat-type air conditioning system of FIG. 1, in which FIG. 3(A) is a pictorial view of an air conditioning system control panel provided on a dashboard; FIG. 3(B) is a graph of the relationship between thermorelay on-off temperature range and temperature-adjusting lever position, the range of the abscissa of which corresponds to that of the temperature-adjusting lever; FIG. 3(C) is a graph the relationship between air-mix door opening percentage and temperature-adjusting lever position; and FIG. 3(D) shows the relationship between output duct air temperature and temperature-adjusting lever position;

FIGS. 5(A)–5(C) are graphical representations for assistance in explaining the operation of the variable thermostat air conditioning system of FIG. 4, in which FIG. 5(A) is a pictorial view of an air conditioning system control panel on a dashboard; FIG. 5(B) is a graph of the relationship between thermorelay on-off temperature and temperature-adjusting lever position, in the same manner as in FIG. 3, when the dehumidification switch is turned off; and FIG. 5(C) is a graph of the same relationship as in FIG. 5(B) when the dehumidification switch is turned on;

FIGS. 6(A)–6(E) are graphical representations for assistance in describing the operation of a second embodiment of the variable thermostat-type air conditioning system according to the present invention, in which FIG. 6(A) is a pictorial view of an air conditioning system control panel on a dashboard; FIG. 6(B) is a graph of the relationship between thermorelay on-off temperature and temperature-adjusting lever position, in the same manner as in FIG. 3, when the dehumidification switch is turned off; FIG. 6(C) is a graph of the relationship between air-mix door opening percentage and temperature-adjusting lever position; FIG. 6(D) is a graph of the relationship between output duct air temperature and temperature-adjusting lever position; and FIG. 6(E) is a graph of the same relationship as in FIG. 6(B) when the dehumidification switch is turned on.

DETAILED DESCRIPTION OF THE PREFERRED EMBODIMENTS

To facilitate understanding of the present invention, reference is made to a prior-art variable thermostat-type air conditioning system, with reference to the attached drawings.

Figure 1:
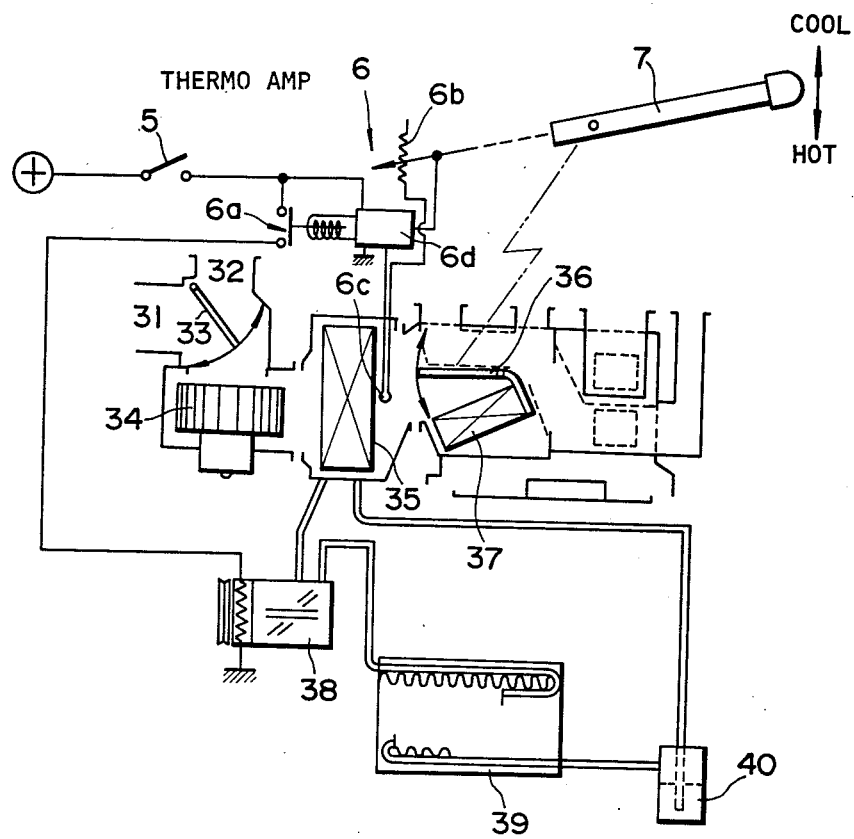
FIG. 1 is a schematic illustration of a representative prior-art variable thermostat-type air conditioning system for an automotive vehicle.

In FIG. 1, the prior-art air-conditioning system comprises an outside air introduction duct 31 and an inside air introduction duct 32, which are selectably opened to the system by an intake door 33, an air blower 34 for drawing air from the outside or inside air introduction ducts 31 or 32 and propelling the air through the system and into the passenger compartment, an evaporator 35 to cool and dehumidify the air drawn in by the blower fan 34, and an air-mix door 36 to distribute some of the air cooled by the evaporator 35 into a heater core 37 to reheat it. In this case, the air reheated by the heater core 37 is mixed with the cool air from the air mix door 36 and is supplied to the passenger compartment through air outlet ducts. The system also includes a compressor 38, condenser 39, and a refrigerant liquid tank 40.

In addition to the above-mentioned mechanical section, the variable thermostat automotive vehicle air-conditioning system comprises a variable thermostat section 6 including a thermorelay 6a, a variable resistor 6b, a temperature-sensitive element 6c, and a thermocontrol amplifier 6d. The air-conditioning system includes main switch 5, and temperature-adjusting lever 7.

In this system, when the temperature-adjusting lever 7 is set at an appropriate position, the total of the resistance values across the variable resistor 6b, as adjusted by the temperature-adjusting lever 7, and temperature-sensitive element 6c (such as a thermistor), disposed on the downstream side of the evaporator 35, is indicated by a voltage supplied to the thermocontrol amplifier 6d. In response to the resistance value indicated by the input voltage of amplifier 6d, the amplifier energizes or deenergizes the thermorelay 6a, connected in series between the air conditioning main switch 5 and the compressor 38, so that the compressor 38 is turned on or off automatically according to the resistance value preset by the temperature-adjusting lever 7 and the temperature sensed by element 6c.

Figure 2:
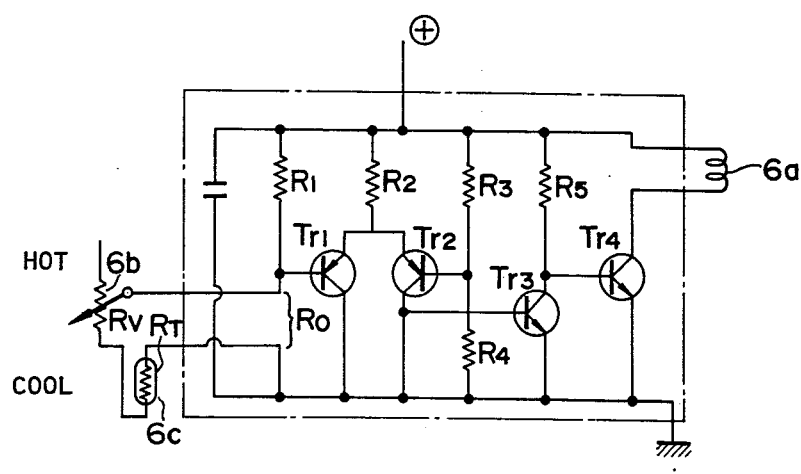
FIG. 2 is a schematic diagram of a thermocontrol amplifier used with the prior art variable thermostat-type air conditioning system for an automotive vehicle of FIG. 1.

To describe the thermocontrol amplifier 6d in more detail with reference to FIG. 2, the thermocontrol amplifier 6d mainly comprises a Schmitt circuit including transistors $Tr_1$ and $Tr_2$ and resistors $R_1$, $R_2$, $R_3$ and $R_4$ and an amplifier circuit including transistors $Tr_3$ and $Tr_4$ and a resistor $R_5$. When the Schmitt circuit including transistors $Tr_1$ and $Tr_2$ is on, the transistor $Tr_3$ is off and the transistor $Tr_4$ is on; or vice versa when transistors $T_3$ and $T_4$ are off. When the transistor $Tr_4$ is on, thermorelay 6a is on to operate the compressor 38; this result occurs since the thermorelay 6a is connected to the collector of the transistor $Tr_4$. The on-level of this Schmitt circuit has been previously determined roughly by values of the two resistors $R_3$ and $R_4$. When the voltage developed across the resistor $R_1$ exceeds this on-level, the transistor $Tr_4$ is turned on to activate the thermorelay 6a. The voltage across the resistor $R_1$ is determined by the ratio of the resistance $R_1$ to the resistance $R_0$, that is, $E[R_1/R_1+R_0]$, where E is the power supply voltage and $R_0$ is the sum of the resistance $R_V$ of the variable resistor 6b and the resistance $R_T$ of the thermistor 6c.

In general, the resistance $R_T$ of the thermistor 6c decreases with increasing temperature. If the variable resistor 6b is set to the HOT side, the value of resistance $R_V$ is relatively large so that the relay 6a is deenergized (the compressor is off); therefore, only when passenger compartment air temperature is high and thus the value of resistance $R_T$ becomes small, does the voltage developed across the $R_1$ exceed the predetermined on-level to turn on the thermorelay 6a to turn on compressor 38. On the other hand, if the variable resistor 6b is set to the COOL side, the value of resistance $R_V$ is almost zero so that the relay 6a is normally energized (the compressor is on); therefore, only when passenger compartment air temperature is low causing the value of resistance $R_T$ to become large, does the voltage developed across the resistor $R_1$ drop below the predetermined on-level to deenergize the thermorelay 6a, causing turn off of the compressor.

Furthermore, since there exists some hysteresis with respect to the on-level of the Schmitt circuit, the temperature at which the compressor 38 is turned on is higher than that at which the compressor 38 is turned off, even if the temperature-adjusting lever is not moved; that is, even if the variable resistor resistance is constant.

Figure 3:
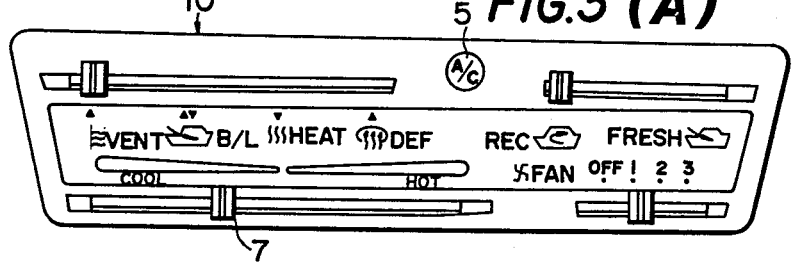
Figure 3:
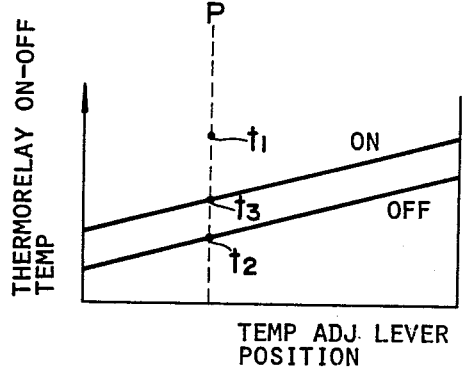
Figure 3:
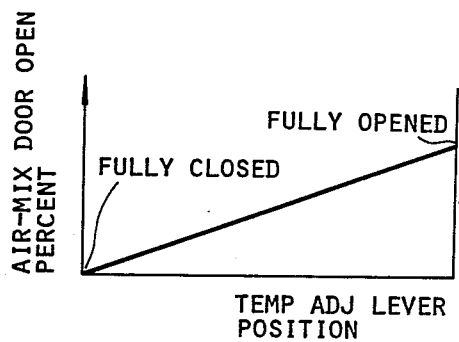
Figure 3:
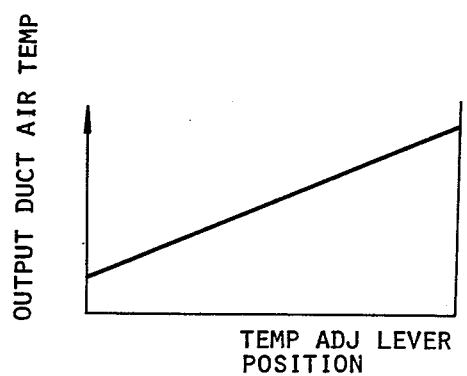

The operation of the thermostat 6 is described in more detail with reference to FIG. 3, in which the length of the abscissa of the graphical representations corresponds to that of the adjustable range of the temperature-adjusting lever 7 on air-conditioning system control panel 10 disposed in the dashboard of an automotive vehicle.

If the temperature-adjusting lever 7 is set, for instance, at the position P in FIG. 3(A), and the outside air temperature (temperature of the air introduced into the evaporator 35) is $t_1$, the thermorelay is automatically turned on when the air-conditioning system main switch 5 is on, so that the compressor 38 operates to cool the air on the downstream side of the evaporator 35. When the cooled air temperature drops to a temperature $t_2$, the thermorelay 6a is automatically turned off to stop the compressor 38. After compressor 38 turns off and when the air on the downstream side of the evaporator 35 has been heated to a temperature $t_3$, the thermorelay 6a automatically turns on again to operate the compressor 38. After compressor 38 is again activated the thermorelay 6a is repeatedly turned on and off between the thermorelay-off temperature $t_2$ and the thermorelay-on temperature $t_3$, so that the air temperature is maintained between $t_2$ and $t_3$.

As can be seen in FIG. 3(B), when the temperature-adjusting lever 7 is shifted to the HOT side (right side in FIG. 3(A), the thermorelay on-off temperature points increase; that is, the thermorelay 6a is energized only at a higher air temperature range, with the result that the passenger compartment air temperature is kept at a higher preset air temperature.

Further, as depicted in FIG. 1 by the dotted-and-dashed lines, the temperature-adjusting lever 7 is mechanically linked with the air-mix door 36 such that setting the adjusting lever 7 to the rightmost and leftmost positions causes the air-mix door to be respectively fully opened and closed, as shown in FIG. 3(C). The air flowing from the output ducts increases in direct proportion to the percentage door 36 is opened, as depicted in FIG. 3(D). This is because the amount of air reheated by the heater core 37 increases as the air-mix door opening percentage increases.

In a variable thermostat-type air conditioning system of the type illustrated in connection with FIG. 3 when passenger compartment air is warmed by heating low-temperature high-humidity outside air and supplied to the passenger compartment the windshield glass tends to be obscured by condensation, especially during rainy weather. In such cases, the compressor may not operate or may turn off soon after being started even if the driver selects the air-conditioning system to operate as a dehumidifier, since the temperature-adjusting lever is set on the HOT side. Therefore, it is necessary to set the temperature-adjusting lever to the COOL side on the system control panel, a troublesome operation.

Figure 4:
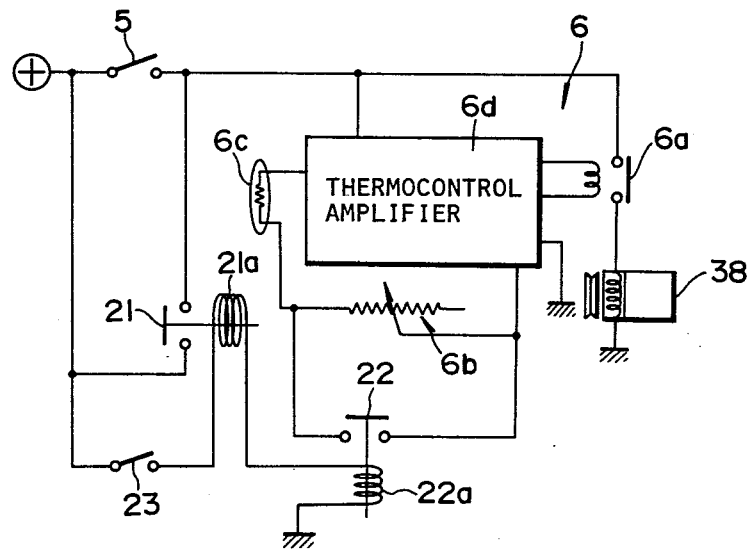
FIG. 4 is a diagrammatical illustration of a first embodiment of the variable thermostat-type air conditioning system for an automotive vehicle according to the present invention.
Figure 5A:
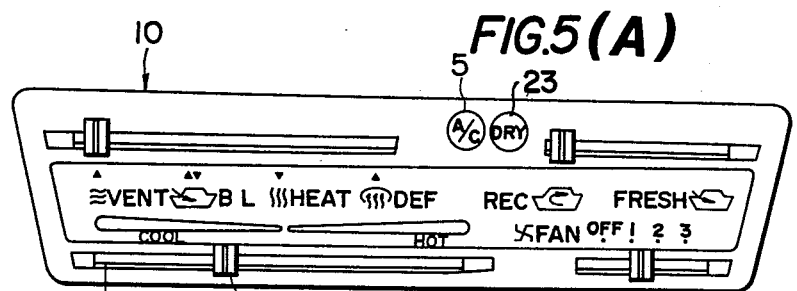

In view of the above description, reference is now made to a first embodiment of the variable thermostat-type air conditioning system according to the present invention, with reference to FIGS. 4 and 5. First, the configuration of an air-conditioning system for an automotive vehicle according to the present invention is described.

The circuit of FIG. 4 includes a first normally-open switch 21, closed when a first relay coil 21a is energized, and a second normally-open switch, closed when a second relay coil 22a is engerzied, a dehumidification switch 23 (DRY) and an air-conditioning system main switch (A/C) 5. Switches 5 and 23 are disposed on the air-conditioning system control panel.

The first switch 21 is connected in parallel with the main switch 5, and the second switch 22 is connected between fixed and movable terminals of the variable resistor 6b. Both the first and second switches 21 and 22 are closed when the dehumidification switch 23 is closed, because both the first and second relay coils 21a and 22a are energized. In this embodiment, however, it is of course possible to use a double-pole, single-throw switch as the dehumidification switch 23 in place of the first and second switches 21 and 22. Therefore, when the driver operates the dehumidification switch 23 to dehumidify passenger compartment air, the first and the second switches 21 and 22 are both closed.

Next, the operation of the first embodiment of the variable thermostat type air-conditioning system according to the present invention is described.

When the dehumidification switch 23 is off, since the first and second switches 21 and 22 are both open, the air-conditioning system is controlled only by the main switch 5. This is the same circuit configuration as that of the prior-art air-conditioning system shown in FIG. 1.

When the dehumidification switch 23 is on, the first switch 21 is closed, causing the compressor 38 to be operated to cool or dehumidify the air, even when the main switch 5 is left open. At the same time, the second switch 22 shorts the fixed terminal and the movable terminal of the variable resistor 6b, causing the system to approximate the state in which the temperature-adjusting lever 7 is shifted to the leftmost position, that is, to the extreme COOL end. Therefore, passenger compartment air is dehumidified readily without first shifting the temperature-adjusting lever to the COOL side and then returning the lever to the preset position after dehumidification.

Figure 5B:
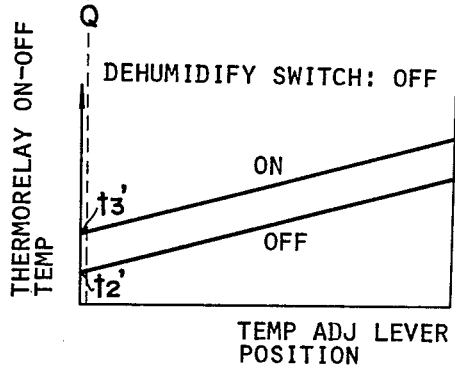
Figure 5C:
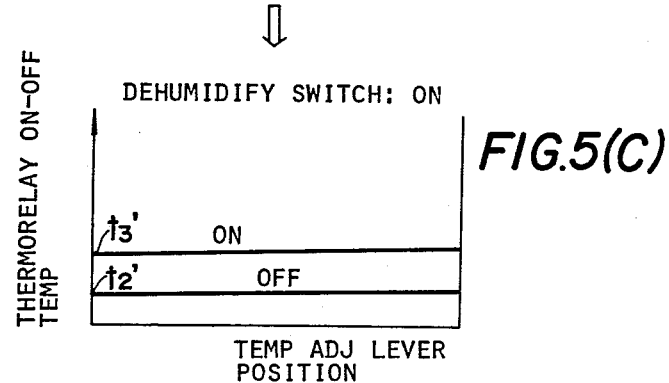

In FIG. 5(B) is a graph of the operation where the dehumidification switch is off. In this Figure, when the temperature-adjusting lever 7 is set to the extreme COOL end Q, the thermorelay 6a turns on at temperature $t_3'$ and turns off at temperature $t_2'$. Therefore, as shown in FIG. 5(C), in the case where the dehumidification switch is on, the thermorelay 6a is turned on at the same temperature $t_3'$ and is turned off at the same temperature $t_2'$, regardless of the position of the temperature-adjusting lever. That is to say, the air-conditioning system functions as a fixed thermostat-type system.

In this embodiment, even if the dehumidification switch 23 is left on for a long time, it is possible to prevent the passenger compartment air from being cooled excessively or the evaporator 35 from becoming frozen over, since the compressor 38 stops intermittently.

FIG. 6 is an illustration of a second embodiment of the variable thermostat-type air conditioning system according to the present invention.

In the second embodiment, the air-conditioning system is controlled in two different control zones A and B. In zone A, used only during summer, the air mix door 36 is usually fully closed so that the air drawn into the system is not reheated by the heater core 37. Further, the temperature of air in the output duct is adjusted solely by the temperature-adjusting lever 7, that is, by changing only the on-or-off temperature range of the thermorelay 6a.

Figure 6A:
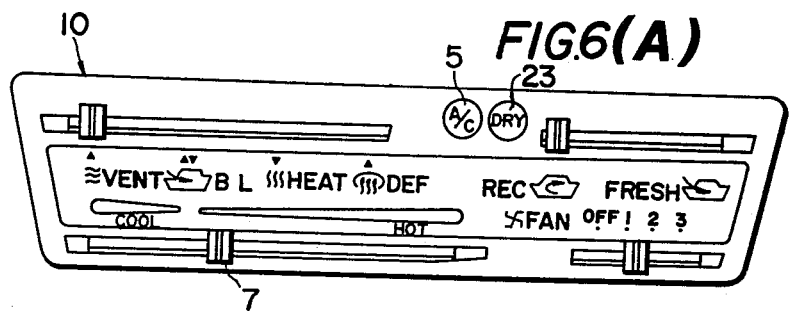
Figure 6B:
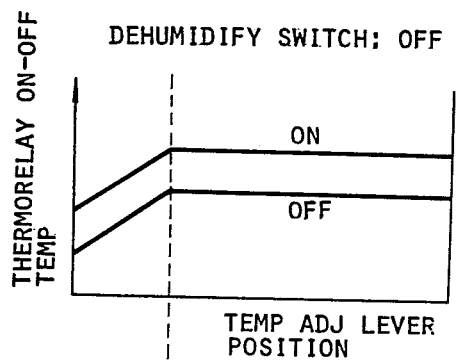
Figure 6D:
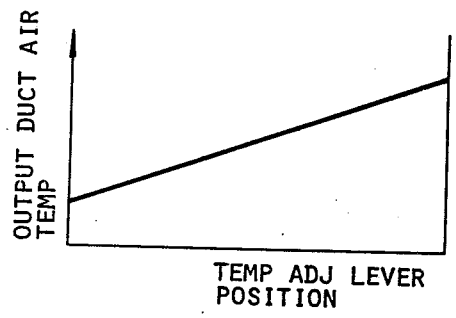
Figure 6C:
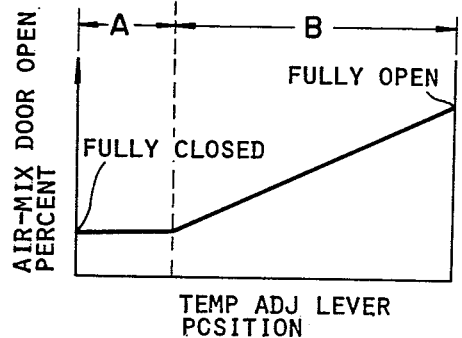

In zone B, the air-mix door 36 is gradually opened as the temperature-adjusting lever 7 is shifted toward the HOT side, so that the temperature of air in the output duct increases with increasing air-mix door opening percentage, due to the heater core 37. On the other hand, the resistance of the variable resistor 6b is held constant in this zone B, as depicted in FIG. 6(B), and the compressor 38 operates less frequently at relatively high passenger compartment air temperatures, so that this air temperature controller saves energy.

Figure 6E:
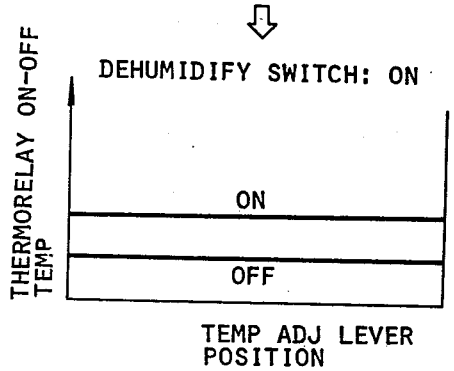

In the case when the first and second switches 21 and 22 and the dehumidification switch 23 are provided in this second embodiment in the same manner as in the first embodiment, it is possible to obtain the same thermorelay on-or-off temperature characteristics as in the first embodiment, as depicted in FIG. 6(E).

As described above, in the variable thermostat-type air conditioning system according to the present invention, since the variable resistor adjusted by the temperature-adjusting lever is shorted when the dehumidification switch is closed, it is possible to operate the compressor to dehumidify the passenger compartment air quickly, regardless of the position of the temperature-adjusting lever. Further, since the thermorelay on-or-off temperature range is automatically changed to that corresponding to when the temperature-adjusting lever is set to the extreme COOL side, it is possible to dehumidify the passenger compartment air by simply depressing the dehumidification switch, without first shifting the temperature-adjusting lever to the COOL side and then returning it to a desirable lever position after dehumidification.

It will be understood by those skilled in the art that the foregoing description is in terms of preferred embodiments of the present invention wherein various changes and modifications may be made without departing from the spirit and scope of the invention, as set forth in the appended claims.

What is claimed is:

1. An air-conditioning system provided with a compressor, an evaporator, and a temperature-adjusting lever, which comprises:
   (1) a thermorelay connected in series with the compressor for operating the compressor when energized;
   (2) a temperature-sensitive element disposed on the downstream side of the evaporator for detecting air temperature, the resistance of said element decreasing with increasing temperature,
   (3) a variable resistor connected in series with said temperature-sensitive element, and linked with the temperature-adjusting lever in such a way that the resistance of said variable resistor is adjusted when the temperature adjusting lever is shifted;

(4) a thermocontrol amplifier responsive to the total resistance of said temperature-sensitive element and said variable resistor for energizing said thermorelay when the sum of temperature-sensitive element resistance and variable resistor resistance drops below a predetermined value and deenergizing said thermorelay when the sum of temperature-sensitive element resistance and variable resistor resistance exceeds another predetermined value; and (5) a dehumidification switch for shorting said variable resistor when closed, whereby when said dehumidification switch is closed, said thermocontrol amplifier energizes said thermorelay when only the temperature-sensitive element resistance drops below the predetermined value and independently of the resistance of the variable resistor.

2. An air-conditioning system as set forth in claim 1, which further comprises an air-conditioning system switch connected between a power supply and the air-conditioning system, said switch being closed while said dehumidification switch is closed and opened when said dehumidification switch is opened.

3. An air-conditioning system as set forth in claim 1, wherein said temperature-sensitive element is a thermistor.

4. An air-conditioning system as set forth in claim 1, wherein said thermocontrol amplifier comprises:
   (a) A Schmitt circuit for deriving an output signal in response to a comparison of the sum of the resistances of the temperature-sensitive element and variable resistor with a predetermined resistance value;
   (b) an amplifier connected to respond to the output signal of said Schmitt circuit for activating said thermorelay.

5. A system for air-conditioning a passenger compartment of an automotive vehicle without fogging a window of the compartment during high humidity conditions comprising:
   (a) an air circulation path including
   (1) means for heating air adapted to be supplied to the compartment,
   (2) means for cooling air adapted to be supplied to the compartment, and
   (3) means for variably mixing the heated and cooled air;
   (b) means for controlling the air heating means, the air cooling means and the mixing means including:
   (1) a temperature sensor in the air circulating path having a resistance that increases and decreases as the circulated air temperature decreases and increases, respectively,
   (2) a variable resistor connected in series circuit with the temperature sensor and controlled by an operator control so that the resistor has large and small values in response to the operator control being respectively set at cool and hot values,
   (3) means responsive to the resistance of the series circuit for activating the means for cooling so that as the resistance of the series circuit decreases and increases the means for cooling has a tendency to be respectively activated and de-activated,
   (4) and means responsive to the operator control for controlling the variable mixing means so that there are greater and lesser percentages of hot air and cool air in response to the operator control being set at hot and cool, respectively, the improvement comprising:
a dehumidification control, and means responsive to activation and deactivation of the dehumidification control for respectively short circuiting the variable resistor and connecting the variable resistor in the series circuit with the temperature sensor, so that the resistance of the series circuit is controlled only by the resistance of the temperature sensor independently of the resistance of the variable resistor when the dehumidification control is activated.

6. A system for air-conditioning a passenger compartment of an automotive vehicle without fogging a window of the compartment during high humidity conditions comprising:
   (a) an air circulation path including
   (1) means for heating air adapted to be supplied to the compartment,
   (2) means for cooling air adapted to be supplied to the compartment, and
   (3) means for variably mixing the heated and cooled air;
   (b) means for controlling the air heating means, the air cooling means and the mixing means including:
   (1) a temperature sensor in the air circulating path having a temperature sensing impedance that changes monotonically in value as the circulated air temperature changes,
   (2) a variable impedance controlled in value by an operator control,
   (3) an on-off dehumidification control switch,
   (4) circuit means for connecting the temperature sensing impedance, the variable impedance, and the switch in circuit with each other and the means for cooling so that the means for cooling is responsive to the impedances of the temperature sensing and variable impedances while the switch is off so that the means for cooling has a tendency to be activated to greater and lesser extents in response to the variable impedance having extreme values in first and second opposite directions, respectively, and the means for cooling is responsive to the impedance of the temperature sensing impedance independently of the impedance of the variable impedance while the switch is on so that the means for cooling has a tendency to be activated as if the variable impedance has an extreme value in the first direction.

7. The system of claim 6 wherein the variable temperature sensing impedances are connected in a series circuit with each other, and the circuit means includes a comparator having input terminals responsive to the impedance of the series circuit and output terminals for deriving a signal for controlling the means for cooling, the switch having terminals for short circuiting the variable impedance when the switch is on.

* * * * *